Sept. 19, 1939.  S. A. HUFFMAN  2,173,587
SAWING AND TRIMMING MACHINE
Filed April 1, 1937   3 Sheets-Sheet 1
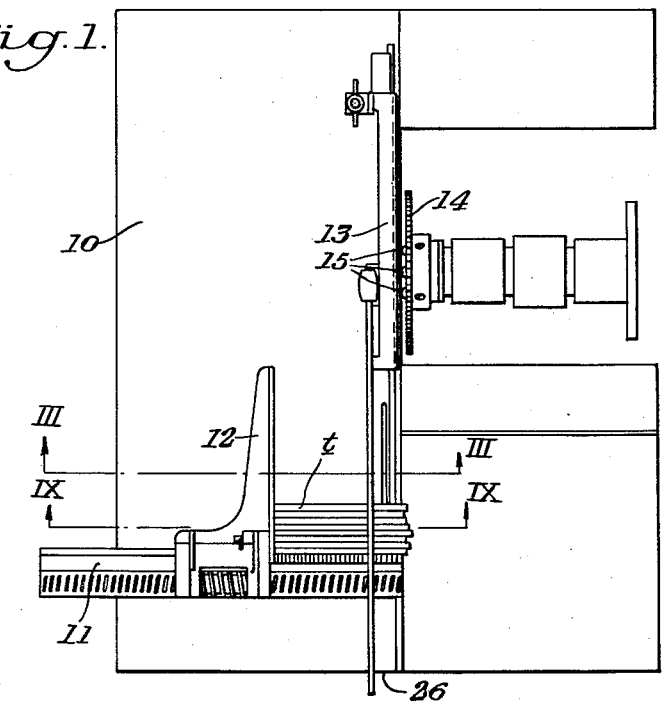
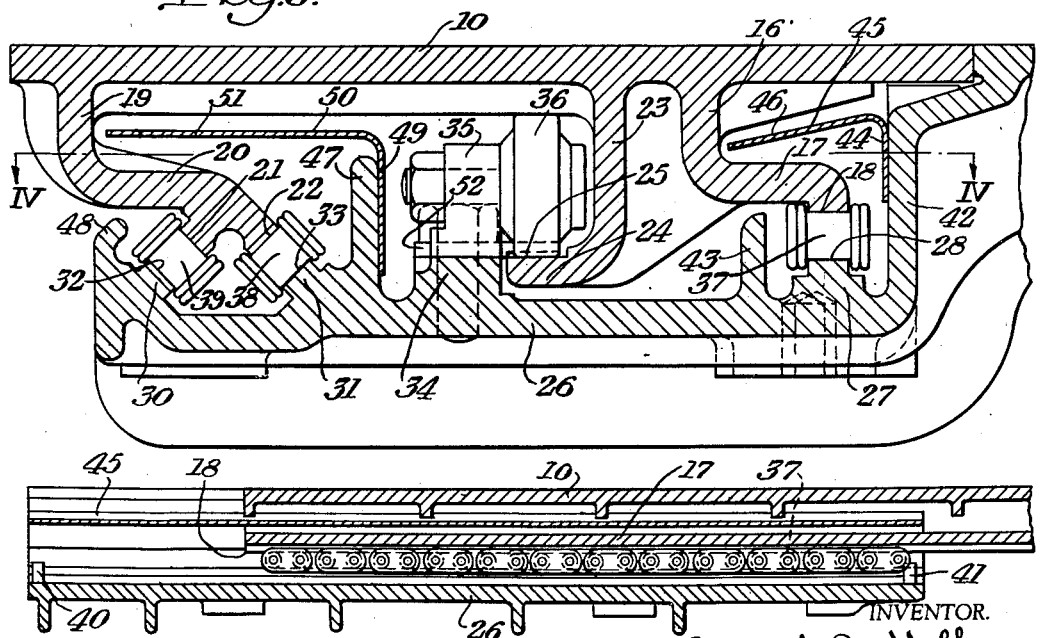
INVENTOR.
Samuel A. Huffman
BY Stebbins, Blenko & Parmelee
ATTORNEYS

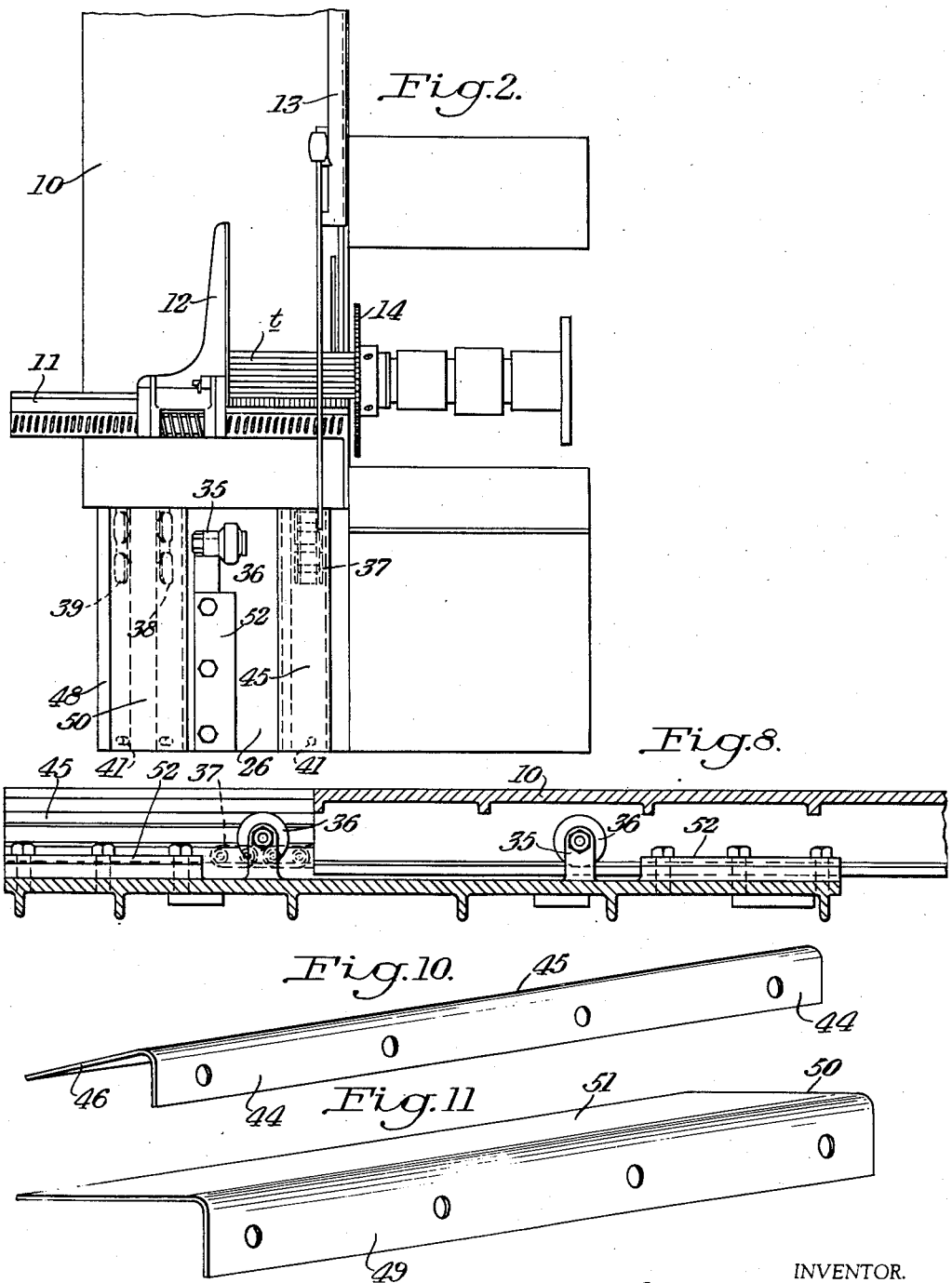

Sept. 19, 1939.   S. A. HUFFMAN   2,173,587
SAWING AND TRIMMING MACHINE
Filed April 1, 1937   3 Sheets-Sheet 3
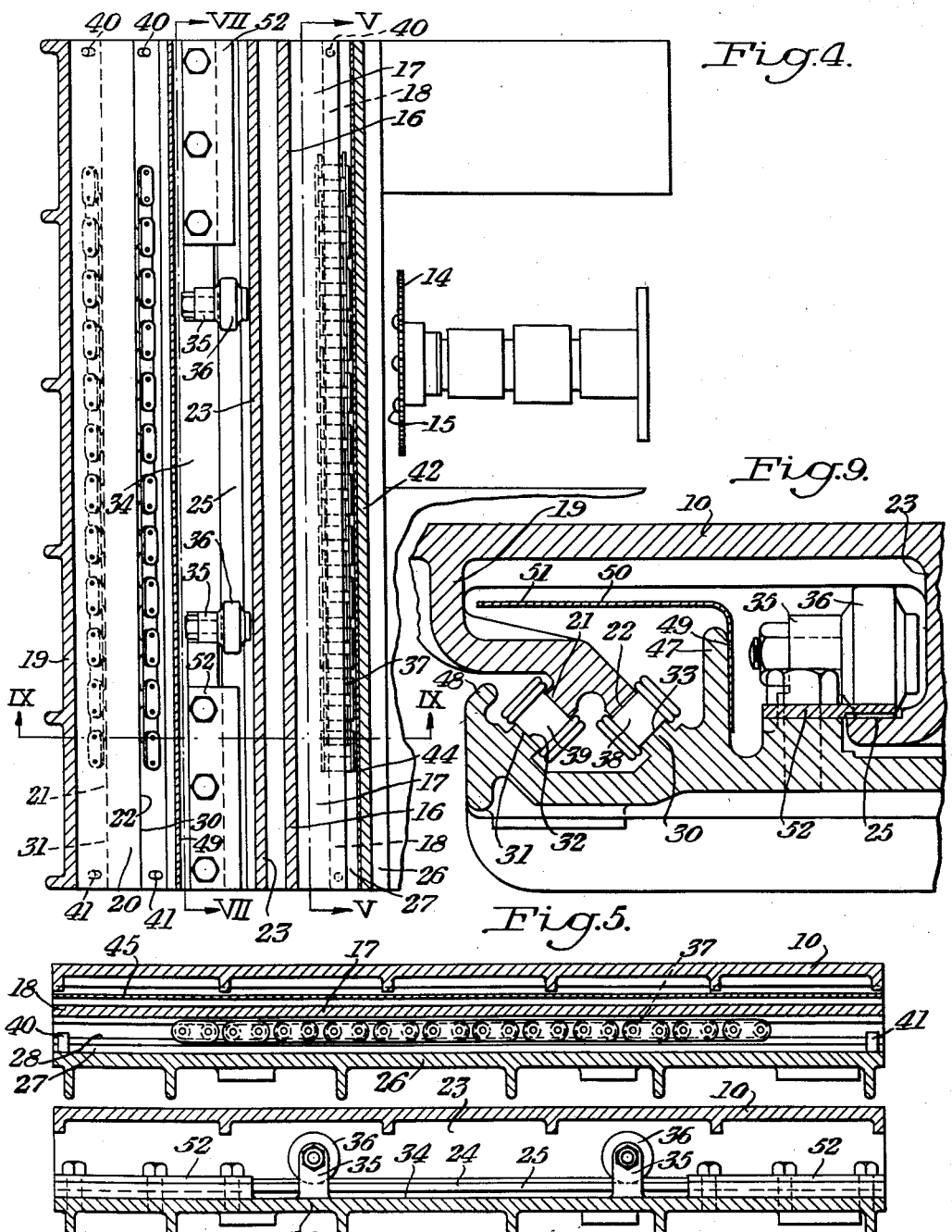
INVENTOR.
Samuel A. Huffman
BY Stebbins Blenko & Parmelee
ATTORNEYS Patented Sept. 19, 1939

2,173,587

UNITED STATES PATENT OFFICE 2,173,587

SAWING AND TRIMMING MACHINE

Samuel A. Huffman, Pittsburgh, Pa., assignor to Miller Printing Machinery Co., Pittsburgh, Pa., a corporation of Pennsylvania Application April 1, 1937, Serial No. 134,341

3 Claims. (Cl. 308—6)

My invention pertains to sawing and trimming machines, in which work-pieces, such, for instance, as type-slugs and the like, are placed in position upon a reciprocable work-table and moved, on such table, past a rotary saw or other cutting tool. The invention relates especially to the work-table employed in such machines.

For several decades there have been in use machines (known as "saw-trimmers") by which type-slugs and other printing-chase material have been cut to determined dimensions and then planed or "trimmed" to obtain a high degree of accuracy in such dimensions. In such machines, the type-slugs are placed upon a work-table which is moved past a saw having trimmer points extending from the face thereof, so that after the saw has cut the slugs, the trimmer-points trim the cut ends to give the desired length, which must be accurate to a very high degree. The work-tables of such machines, and the bases upon which such tables reciprocate, have heretofore been provided with interengaging slideways. It was necessary that these slideways be machined with great care, in order to avoid any variation in the movement of the work-table; because such variation, if it existed, would destroy the accuracy of the cut made by the saw and trimmers. As a consequence of this construction involving interengaging slideways, a relatively large amount of manual power was required to be exerted in pushing the work-table to and fro; and this, of course, detracted somewhat from the speed and ease with which the cutting operation could be performed.

It is the principal object of my invention to produce a sawing and trimming machine in which the above-named difficulty, with respect to the ease and speed of movement of the work-table, will be obviated by mounting the table upon anti-friction rollers or the like. With such a mounting, the obtaining of the essential extreme accuracy of reciprocating movement might normally be questionable; and it is a further object of my invention, therefore, to provide such a mounting which will safely give this accuracy. Other and further objects of the invention will appear from the following specification and the claims annexed thereto.

I have described, by way of example, in the following specification, and shown in the accompanying drawings, one form of sawing and trimming machine embodying a work-table constructed in accordance with my invention. I wish it understood, however, that the invention may be embodied in other forms, and that changes can be made in the particular form described and shown, without exceeding the scope thereof as defined in the appended claims.

In the drawings:

Fig. 1 is a plan of a sawing and trimming machine with the work-table in its normal position;

Fig. 2 is a view similar to Fig. 1, but showing the work-table moved forward into the position in which the saw is operating upon the type-slugs;

Fig. 3 is an enlarged section, taken on the line III—III of Fig. 1, showing the construction of the improved work-table;

Fig. 4 is a sectional plan, on an intermediate scale, the section being taken as on the line IV—IV of Fig. 3;

Fig. 5 is a section on the line V—V of Fig. 4;

Fig. 6 is a view similar to Fig. 5, but showing the work-table as moved forward into the position shown in Fig. 2;

Fig. 7 is a section on the line VII—VII of Fig. 4;

Fig. 8 is a view similar to Fig. 7, but showing the work-table moved forward into the position shown in Fig. 2;

Fig. 9 is a section on the line IX—IX of Fig. 1 or 4, showing the means for retaining the table against tipping when the table is moved very far to the front or rear; and Figs. 10 and 11 show chip-guards which are employed in connection with the work-table.

Referring now to the drawings, the conventional "saw-trimmer" includes a work-table 10 provided with a side-gage 11 upon which is mounted a movable end-gage 12. The material to be cut (in the instance shown, a batch of type-slugs, designated t) is placed in engagement with the side-gage and adjusted end-gage and locked in position by means of a vise of suitable construction, such as that designated 13. Thereupon the work-table is pushed from the position shown in Fig. 1 to a position such as that shown in Fig. 2, in which the type-slugs encounter a rotary saw 14 having trimmer points 15 projecting from the face thereof; so that the ends of the type-slugs are cut off by the saw and the cut ends then planed or "trimmed" by the trimmer points. The length to which the type-slugs are cut is determined, of course, by the adjustment of the end-gage 12; and printing practice requires that this length be determined and maintained with the highest degree of accuracy. Therefore it will be seen that the reciprocating movement of the table 10 must be effected exceedingly accurately. A feature of the present invention is the obtaining of this accuracy in connection with a work-table constructed to reciprocate upon roller bearings or the like, as differentiated from the frictional slideways which have heretofore been employed.

In the embodiment of my invention now being described, the work-table is formed, near one side, with a downwardly extending web 16 having a horizontal extending portion 17, the edge of which is turned downward and machined to constitute a horizontal track 18. The table is further formed, near the other side, with a second downwardly extending web 19 having a horizontal portion 20, the edge of which is turned downward and machined to produce two inclined tracks 21 and 22, respectively. While the track 18 is horizontal, the tracks 21 and 22 are angularly disposed, the angle preferably being 45°. Intermediate the webs 16 and 19, the table is formed with a third downwardly extending web 23 having a horizontal portion 24, the upper face of which is machined to form a track 25. The tracks 18, 21 and 22 engage downwardly upon anti-friction rollers or the like, to permit the work-table to be moved forwardly and rearwardly. The track 24 engages beneath anti-friction rollers or the like, to prevent tilting of the work-table.

The work-table reciprocates upon a base 26. This base is formed with an elongated rib 27, the top edge of which is machined to produce a track 28 disposed opposite the track 18 of the work-table. The base is further formed with angularly disposed ribs 30 and 31, the faces of which are machined to produce inclined tracks 32 and 33, disposed opposite the tracks 21 and 22 of the work-table. The base is further formed with a substantially central elongated rib 34, carrying a pair of spaced upwardly extending lugs 35 in which are mounted bearings for rollers 36 adapted to engage above and upon the track 25 of the work-table.

A roller chain 37 is disposed between the track 28 of the base and the track 18 of the work-table. Roller chains 38 and 39 are disposed between the tracks 32 and 33 of the base and the tracks 21 and 22 of the work-table, respectively. It will be noted that, providing that there is no vertical play, there can be no sidewise motion of the work-table as it is reciprocated on the roller chains, this resulting from the angular disposition of the tracks 21 and 22 of the table and of the tracks 32 and 33 of the base between which the chains 38 and 39 operate. Any vertical movement of the work-table is prevented by the engagement of the rollers 36 upon the track 25 of the work-table. The pressure of the rollers 36 upon the track 25 is made adjustable by any well-known means,—such as by making the roller-pins eccentric.

It will be noted that for any movement of the work-table through a given distance in either a forward or rearward direction, the chains 37, 38 and 39 will move through one-half that distance. The lengths of the chains are determined with that condition in view, the chains being normally disposed central of the length of the work-table, as indicated in Fig. 5. Pins 40 and 41 are provided to extend upwardly from the base 26, at each end of the latter, in the path of the chains 37, 38 and 39. The effect of these pins is that if a chain should become displaced, with respect to the correct position in relation to the tracks upon which it runs, it would ultimately come into engagement with either one of the pins 40 or one of the pins 41. Upon coming into such engagement, the chain could move no further; so that the table would necessarily slide over such chain instead of rolling thereon. This would re-position the chain; so that upon the movement of the work-table in the opposite direction, the chain would be found substantially in its correct location.

Taking one example of the foregoing, there is no occasion for the work-table to move forward beyond a point where the front face of the side-gage 11 passes materially beyond the center of the saw 14. Likewise, there is, considering the capacity of the vise 13, no occasion for the work-table to move rearwardly beyond the position shown in Fig. 1. Supposing, now, that the chain 37, for instance, should "creep" forward,—that is, in a direction toward the pins 40. A slight amount of such creeping would not affect the operation of the table. But if the creeping became material, the chain, when the table was moved forward until the side-gage came up to, or beyond, the center of the saw, would engage, and be stopped by, the pin 40. Since the length of the chain and the position of the pins 40 are determined by the condition that any sawing and trimming operation will be completed when the front face of the side-gage 11 has reached the center of the saw, this stoppage of the chain, and the resulting slight sliding movement of the table with respect to the chain, will have the effect of re-positioning the chain substantially into its correct location relatively to the work-table. The same will occur should any "creeping" take place rearwardly, or towards the stops 41. The chains will always be brought substantially to their correct position by a movement of the work-table either forwardly beyond the position in which the side-gage has reached the center of the saw, or rearwardly beyond the normal position shown in Fig. 1.

The base 26 is formed with a web 42 and elongated flange 43, which web and flange enclose between them the track 28. To the web 42 is secured the vertical portion 44 of an elongated chip-guard 45, said chip-guard being formed of angular shape in cross-section. The chip-guard has a substantially horizontal, but somewhat downwardly inclined, portion 46 which overlies the horizontal portion 17 of the web 16 of the work-table and extends beyond the elongated flange 43 of the base. It will be seen that, because of the horizontal portion 17 of the web 16 and of the flange 43 of the base, and because of the chip-guard 45, the chain 37 operates in a chamber which is closed from above; so that saw-chips, dirt and the like have no opportunity for access to the chain and the tracks 18 and 28 between which it operates.

The base 26 is further formed with elongated flanges 47 and 48, which enclose between them the tracks 32 and 33 upon which the chains 38 and 39 run. To the flange 47 is secured the vertical portion 49 of a second chip-guard, 50, said chip-guard having a substantially horizontal portion 51 which overlies the tracks 32 and 33, and extends beyond the flange 48. Thus the chains 38 and 39 operate, like the chain 37, in a chamber which is closed from above, against the admission of chips or the like, by the horizontal portion 51 of the chip-guard 50.

The track 25 of the work-table is, of course, not exposed. Access of chips to the chains 37, 38 and 39, and to the tracks between which they run, is effectively avoided by the above-described construction, including the offset position of the work-table chain-tracks and the chip-guards 45 and 50 covering the chain-tracks and chains.

When the work-table is moved forwardly to a normal extent, as indicated in Figs. 6 and 8, tilting thereof is prevented by the engagement of one of the rollers 36 upon the work-table track 25. However, for one reason or another, it may happen that an operator would move the work-table forwardly beyond this point,—in which case the end of the work-table track 25 would pass beyond the foremost of the two rollers 36. To prevent the work-table from tilting off the base (as it would otherwise do in these circumstances), plates 52 are secured to the web 34 of the base at each end of the latter (Figs. 4 and 9). These plates are so located as to provide a slight vertical clearance between themselves and the track 25 of the base. The effect is, that if the work-table is moved, either forwardly or rearwardly, so that an end of its track 25 passes beyond the rollers 36, the work-table will still be confined, because of the engagement of its track 25 beneath one or the other of the plates 52. Because of the slight vertical clearance between the track 25 and the respective plate 52, the work-table will tend to tilt slightly, creating a binding effect which will make it difficult to move the table further. The operator is thus warned of the possibility of moving the work-table entirely off the base; and if he wishes to do so must apply considerable force.

In the sawing and trimming machine of my invention, the work-table can be moved to and fro with respect to the saw with the application of the slightest of effort,—making the machine exceptionally easy and pleasant to use. At the same time, the essential high degree of accuracy in the reciprocating movement of the work-table is retained. The construction, further, embodying the offset track members of the work-table and the chip-guards which cooperate therewith, is such that there is no opportunity for the essential accuracy of table movement to be destroyed because of saw-chips or the like finding their way into the tracks or chains and thereby creating wear of the latter. Normal wear, such as would lessen the accuracy of movement of the work-table, cannot take place until there has been a long period of service of the machine. When and as such wear does occur, its effect can be eliminated by an adjustment of the rollers 36 to take it up.

Having thus fully described my said invention, what I claim as new and desire to secure by Letters Patent is:

1. In combination, a supporting base, a pair of tracks extending substantially horizontally therealong, a third track on said base spaced laterally of said first-mentioned tracks and parallel thereto, a carriage reciprocable along said tracks, said carriage having a track opposite each track on the base for cooperation therewith and a bearing device comprising a plurality of spaced anti-friction rollers between each pair of cooperating tracks, the faces of said first-mentioned tracks being at an angle to each other and at oblique angles to the horizontal so that the weight of said carriage restrains it against lateral shifting.

2. In combination, a supporting base, a pair of upwardly facing tracks extending substantially horizontally therealong, a third upwardly facing track on said base spaced laterally of said first-mentioned tracks and substantially parallel to the general plane of the base, a carriage reciprocable along said base, a track on said carriage opposite each track on the base for cooperation therewith, a roller chain between each pair of cooperating tracks, said first-mentioned tracks having their faces at an angle to each other and at oblique angles to the horizontal so that the weight of the carriage restrains it against lateral shifting, an upwardly facing track depending from said carriage, and anti-friction means cooperating with said upwardly facing track to maintain said carriage against movement upwardly from said base.

3. In combination, a supporting base, a carriage reciprocable therealong, a pair of tracks on said base extending along the path of movement of said carriage, a third track on said base spaced from said first-mentioned tracks and parallel thereto, a track on said carriage opposite each track on the base for cooperation therewith, and a bearing device comprising a plurality of spaced anti-friction rollers between each pair of cooperating tracks, said first-mentioned tracks having their faces at an angle to each other so as to restrain said carriage against shifting laterally of said tracks, and the face of said third track being substantially parallel to the general plane of said base.

SAMUEL A. HUFFMAN.